May 29, 1956  R. A. WITTREN  2,747,562

STARTING SYSTEM FOR INTERNAL COMBUSTION ENGINE

Filed Jan. 4, 1954  3 Sheets-Sheet 1

INVENTOR.
R. A. WITTREN

BY

ATTORNEYS

May 29, 1956  R. A. WITTREN  2,747,562
STARTING SYSTEM FOR INTERNAL COMBUSTION ENGINE
Filed Jan. 4, 1954  3 Sheets-Sheet 2

INVENTOR
R. A. WITTREN

ATTORNEYS

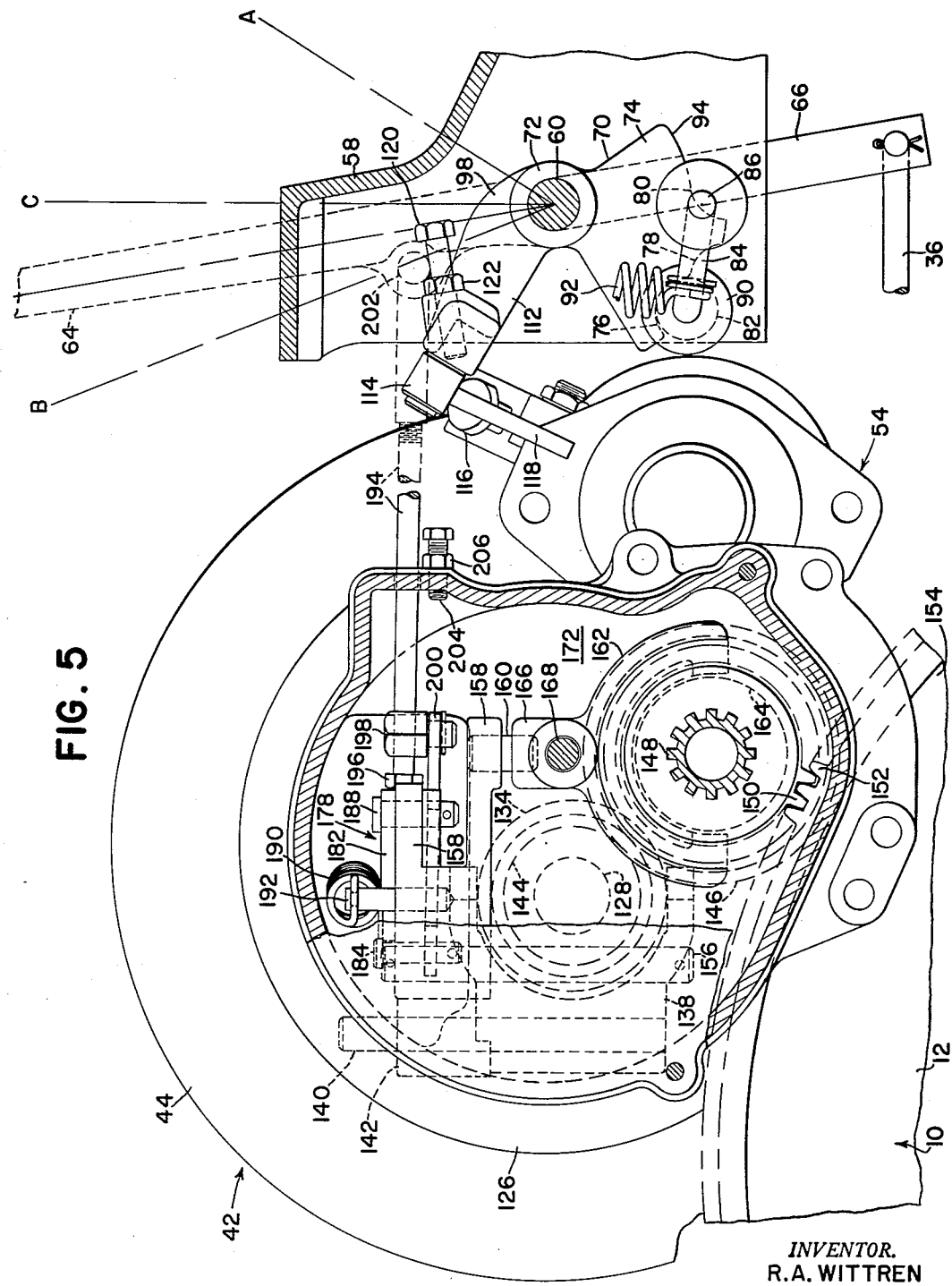

United States Patent Office 2,747,562
Patented May 29, 1956

2,747,562

STARTING SYSTEM FOR INTERNAL COMBUSTION ENGINE

Richard A. Wittren, Cedar Falls, Iowa, assignor to Deere Manufacturing Co., Dubuque, Iowa, a corporation of Iowa Application January 4, 1954, Serial No. 402,004

16 Claims. (Cl. 123—179)

This invention relates to a starting system for internal combustion engines and more particularly to mechanism for starting a main diesel engine by an auxiliary volatile-mixture engine.

It is a well known fact that solid-fuel injection engines are relatively difficult to start, especially in cold weather, and various types of starting systems have been exploited for making the starting task easier. In some cases, the diesel engine is run for a short period on a volatile mixture and then switched over to solid fuel. In other cases, the diesel is motored by a small auxiliary engine until the diesel has warmed up enough so that it will run by itself. The present invention pertains to the latter type of system and has for a principal object the over-all improvement of a starting system of the character mentioned, aiming primarily at facilitating the coordinated controls between the auxiliary and main engines by the use of a single control lever that accomplishes all of the necesssary steps in the starting procedure.

In a system of this type, the main or diesel engine is temporarily relieved of compression by relieving one or more of its combustion chambers so that it may be more easily turned over or motored. After the auxiliary engine is started, means must be provided for connecting the auxiliary engine to the main engine and, subsequently, after the main engine has started and is running under its own power, means must be provided for disconnecting the two engines so that the large engine does not run away with the small one. It is a requisite of any system of this character that the steps in the starting procedure be carried out in proper sequence. Heretofore, as far as is known, the sequence has been accomplished only by the use of several control levers and the coordination has depended upon the skill of the operator. According to the present invention, a single control lever is used, movable in one direction to start the small engine and movable through successive ranges in the opposite directions to accomplish succeeding steps in the starting procedure. The lever may be returned in its first direction to a neutral position in which there are accomplished disconnection of the two engines and restoration of the operative compression characteristics of the main or diesel engine.

The foregoing and other important objects and desirable features inherent in and encompassed by the invention will become apparent from the accompanying disclosure of a preferred embodiment of the invention, as described in detail in the specification and as illustrated in the attached drawings, the several figures of which will be described below.

Fig. 5 is a view of a portion of the structure of Fig. 1, with parts broken away substantially as seen along the line 5—5 of Fig. 4.

Figure 1:
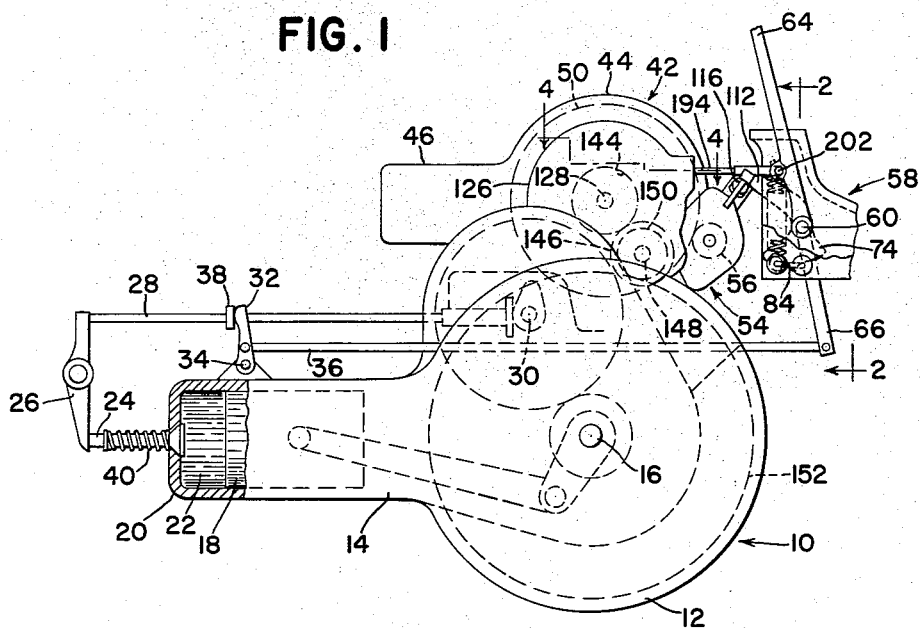
Fig. 1 is a general view, largely schematic and partly in section, showing the relationship of the starting system to the two engines.

Reference will be had first to Fig. 1 for an overall explanation of what is involved. In that figure, the numeral 10 designates generally a diesel engine comprising a crankcase 12, one or more horizontally disposed cylinders 14, a crankshaft 16 and one or more pistons, as at 18. The particular engine shown is somewhat like that in the U. S. patent to McCray 1,919,069; although, the engine may be of any other type.

The cylinder 14 has a cylinder head 20 which defines a compression chamber 22 intermittently exhausted by means of an exhaust valve 24. The exhaust valve is caused to open and close by means including a rocker arm 26, push rod 28 and cam shaft 30, all of which is not unconventional. However, the exhaust valve 24 may be temporarily maintained in an open position by compression relief control means comprising a rockable arm 32, pivoted at 34, as on the cylinder 14, and selectively movable back and forth by means of a control rod or link 36. The free end of the arm 32 engages a stop 38 fixed to the push rod 28 to form a one-way connection so that movement of the rod 36 in a forwardly direction (or to the left as seen in Fig. 1) pushes the push rod 28 also forwardly and rocks the rocker arm 26 in a counterclockwise direction to open the valve 24 against its spring 40, all of which results in relieving compression in the combustion chamber 22 so that the main engine crankshaft 16 may be more easily turned. There are, of course, other ways of decompressing the diesel engine, but that shown is deemed to be representative of others and sufficient for present purposes.

Figure 4:
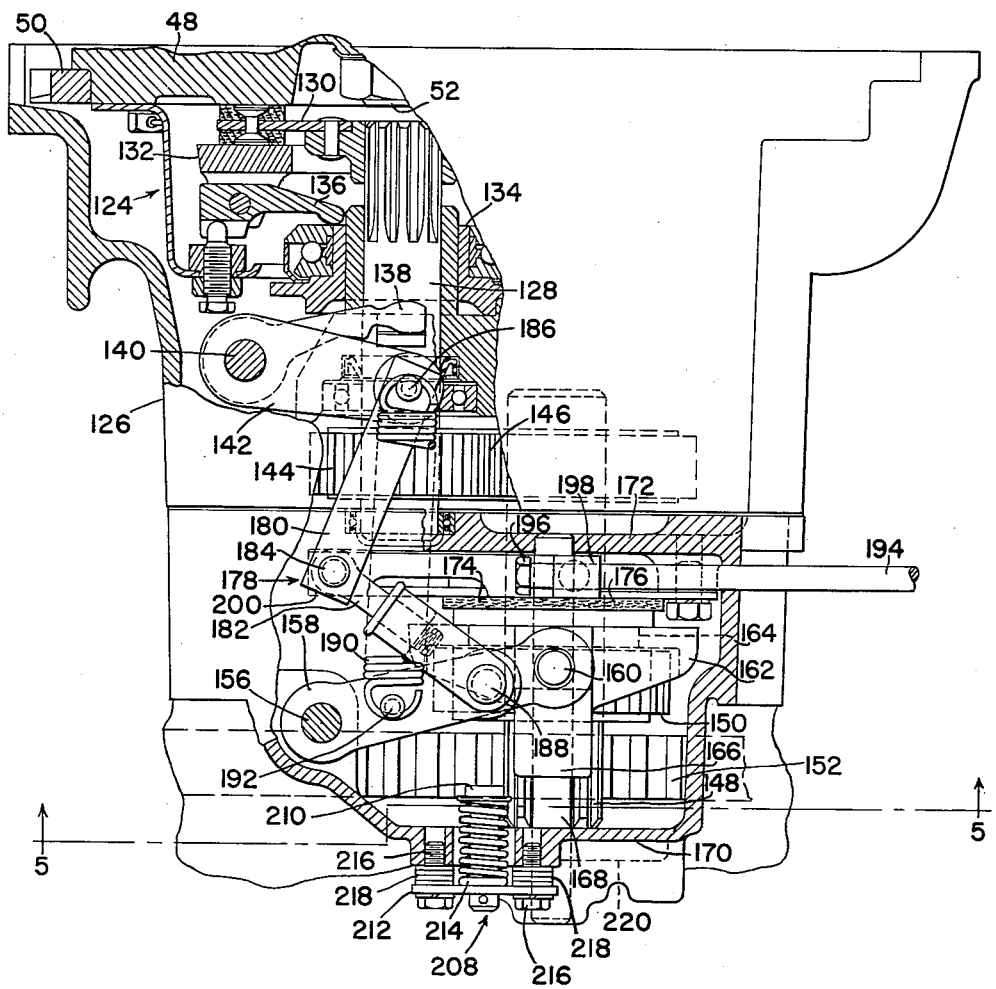
Fig. 4 is a plan view, partly in section, as seen substantially along the line 4—4 of Fig. 1.

The engine 10 may be mounted in a tractor with the cylinder or cylinders 14 lying horizontally and fore-and-aft as respects the longitudinal extent of the tractor, as illustrated in the McCray patent. The tractor may further include, as suggested in the U. S. patent to Du Shane 2,538,147, an auxiliary starting engine, designated here in its entirety by the numeral 42. This engine may include a crankcase 44, one or more cylinders, as at 46, and a flywheel 48 (Fig. 4) to which is secured a starter ring gear 50. A portion of the starting engine crankshaft appears in Fig. 4 and is designated by the numeral 52.

The starting engine may be started in the first instance by a conventional electric starter, as shown generally at 54 in Fig. 1, which starter has a starting pinion 56 engageable with the starting engine ring gear 50.

On the basis of the description thus far, and ignoring for the moment details to be described later, the diesel engine 10 is started by the following procedure: First, the electric starter 54 is energized to drive and start the starting engine 42. After the staring engine warms up, then the decompression control rod 36 is shifted forwardly to open the exhaust valve 24 and thus to relieve compression in the Diesel engine compression chamber 22. Drive means from the starting engine to the diesel engine are then connected and the Diesel engine is motored. After the diesel engine warms up, full compression is restored by moving the decompression control rod 36 rearwardly or to the right and solid fuel is injected so that the Diesel engine runs under its own power. Simultaneously with actual starting of the diesel engine, the two engines are disconnected so that the diesel engine does not run away with the small engine. The following description will pertain to the mechanism by means of which the previously described steps are coordinated by means of a single control lever.

The engines themselves, as well as adjacent supporting structure, may be considered as supporting means for the engines and for mechanism associated therewith. In the present instance, the numeral 58 is employed to designate a support in the form of a bracket on which the control means is carried.

Figure 2:
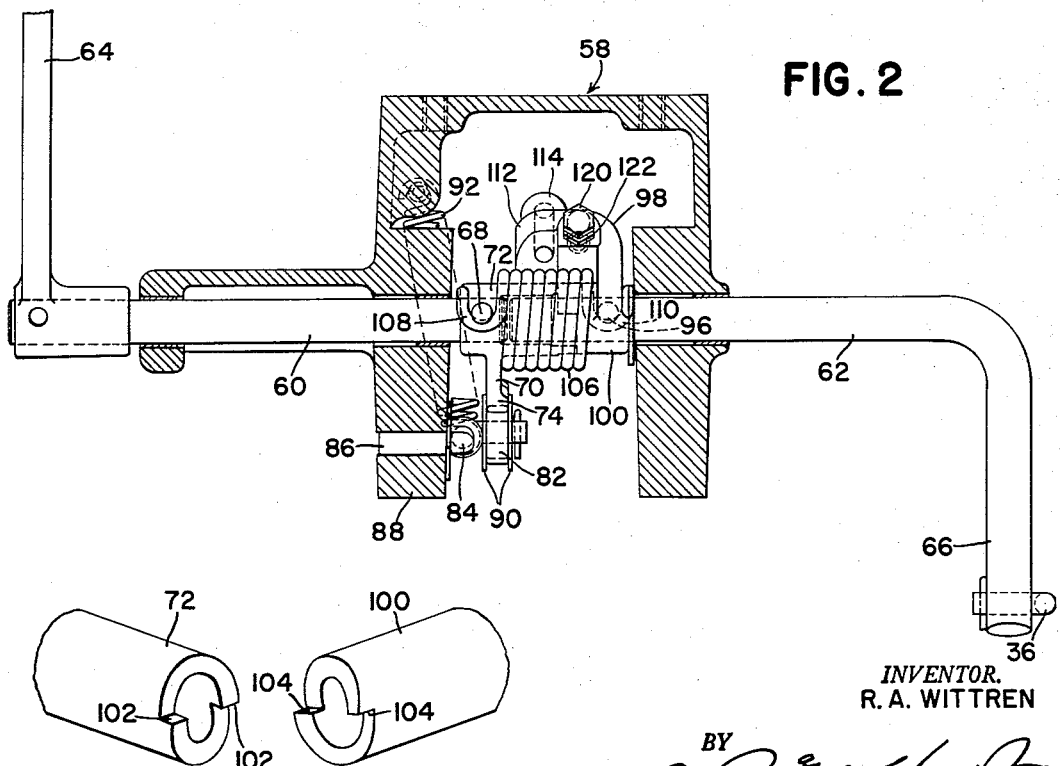
Fig. 2 is a transverse sectional view, on an enlarged scale, as seen substantially along the line 2—2 of Fig. 1.

As best shown in Fig. 2, the bracket carries a pair of coaxial rockable members in the form of first and second rockshafts 60 and 62, the former of which has keyed to its left-hand or outer end an upstanding manual control lever 64 and the latter of which has formed integrally with its inner or right-hand end a depending lever arm 66 that is in turn connected to the decompression control rod 36.

The inner end of the first rockshaft 60 has pinned thereto, as by a pin 68, an arm 70 which includes a hub 72 and an integral depending portion in the form of a cam 74. As shown in Fig. 5, the cam portion 74 has therein first, second and third arcuate notches 76, 78 and 80, which notches are selectively cooperative with a roller 82 carried on a swinging arm 84 pivoted at 86 to an integral wall portion 88 of the support or bracket 58. The roller 82 includes at each side thereof a washer 90, and the washers serve to keep the roller from lateral displacement relative to the cam 74. The roller is maintained in engagement with the cam by means of a tension spring 92 connected between the arm 84 and an upper portion of the bracket wall 88. The shapes of the notches 76, 78 and 80 are such that a detent means is established capable of holding the control lever 64 in the neutral position shown in full lines in Fig. 1 and in dotted lines in Fig. 5 or in a maximum rearward position A (Fig. 5). In this latter position, the notch 80 will be engaged by the roller 82. However, it will be noted that the notch 80 tails off at 94 so that additional rearward movement may be had if desired. The shape of the notch 78 is such that although the roller 82 will engage therein, it will not establish a detent action but will permit the spring 92 to return the control lever 64 to its neutral position.

Figure 3:
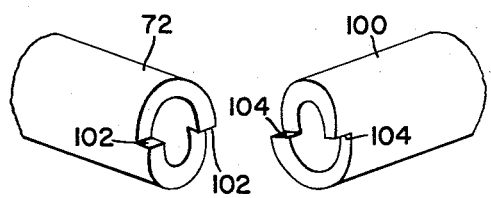
Fig. 3 is an exploded perspective view showing the one-way driving connection in the starting control shaft.

The end of the rockshaft 62 that is proximate to the inner end of the rockshaft 60 has pinned thereto, as to 96, an arm 98 that includes a hub 100. The hub 100 is thus coaxial with and proximate to the hub 72 and the two are related to establish a one-way driving connection, the details of which will be readily apparent from Figs. 2 and 3, wherein it is shown that the inner end of the hub 72 has thereon a pair of diametrically opposed jaws 102 which are unidirectionally engageable with cooperating jaws 104 on the hub 100. The relationship is such that the rockshaft 60 drives the rockshaft 62 only when the rockshaft 60 is rotated in a counterclockwise direction, as viewed in Fig. 5. There is thus no positive driving connection between the rockshafts 60 and 62 when the rockshaft 60 is rocked in a clockwise direction. However, a yieldable driving connection is established between the two rockshafts. This driving connection takes the form of a torsion spring 106 encircling the coaxial hubs 72 and 100 and having opposite ends 108 and 110 hooked respectively over the hub pins 68 and 96. Because of this structure, clockwise rotation of the rockshaft 60 tends to wind up the spring 106 which in truth tends to impart clockwise rotation to the rockshaft 62. However, in the event that clockwise rotation of the rockshaft 62 is impeded, clockwise rotation of the rockshaft 60 may continue. As a matter of fact, a positive stop is provided to limit rearward or clockwise rotation of the rockshaft 62. This stop will be described immediately below.

The arm 98 includes an integral lever portion 112 that projects forwardly and upwardly and is equipped at its free end with a roller 114. The electric starter 54 has a starter switch 116 engageable by a pivoted lever 118 which is in turn engaged by the roller 114 on the starter lever 112 as the starter lever is moved forwardly and downwardly as a result of counterclockwise rotation of the rockshaft 62. As stated above, the rockshaft 62 can rotate in a clockwise direction in unison with the rockshaft 60 to the extent permitted by the yieldable driving connection set up by the torsion spring 106. A limit on this movement of the rockshaft 62 and accordingly on the starter lever 112 is established by cooperating stops comprising a rear portion or wall of the bracket 58 and an adjustable stop screw 120 carried by the starter lever 112. The adjusted position of the stop screw 120 may be maintained by a conventional jam nut 122. The position of the lever 64 when it is moved forwardly to engage the starter switch 116 via the starter lever 112 is represented by the line B. The position of the lever when the stop screw 120 engages the rear wall of the bracket or support 58 is represented by the intermediate line C.

After the small or starting engine is started, it must be connected to the main engine by suitable driving means. In the present instance, the flywheel 48 of the small engine is associated with disengageable driving means in the form of a single-plate clutch designated in its entirety by the numeral 124. The crankcase 44 of the small engine includes rigid thereon a housing 126 within which the clutch 124 is enclosed. This housing journals a driven shaft 128 which is coaxial with the small engine crankshaft 52 and which has splined thereon a driven clutch part or plate 130. This clutch plate is selectively engageable and disengageable between one radial face of the flywheel 48 and a pressure plate 132, control of which is achieved by a control collar 134 and one or more control arms as at 136. The clutch is of the type that is biased for disengagement, which means that the collar 134 is normally urged in a downward direction as viewed in Fig. 4. Clutch-control means is provided for shifting the collar 134 upwardly or in the opposite direction to effect engagement of the plate 130 between the flywheel 48 and pressure plate 132.

The means last referred to comprises a collar-control yoke 138 keyed to an upright rockshaft 140. An actuating arm or lever 142 is keyed to the upper end of the rockshaft 140 and extends rearwardly or to the right, as viewed in Figs. 4 and 5, lying in a plane above the uppermost part of the clutch-control yoke 138.

The clutch-driven shaft 128 has keyed thereto a small gear 144 that is in constant mesh with a gear 146 keyed to a countershaft 148. The countershaft has its axis parallel to and slightly below and to the rear of the clutch-driven shaft 128 (Fig. 5) and appropriately splined on the countershaft is an axially shiftable starter pinion 150 adapted selectively to be engaged with or disengaged from a starter ring gear 152 integral with the main engine flywheel 154.

The slidable starter pinion 150 is normally disengaged from the diesel engine ring gear 152 and means is provided for selectively engaging and disengaging the pinion and gear. This means is coordinated with the clutch-control means, in a manner to be described below.

A second upright rockshaft 156, spaced outwardly from the previously described rockshaft 140 for the arm 142, establishes a pivot for a pinion-control arm or lever 158, the rear or free end of which is pivotally connected at 160 to a yoke 162 that embraces a grooved collar 164 integral with or fixed to the sliding pinion 150. The upper portion of the yoke is formed as a bearing 166 slidable back and forth on a fixed rod 168 appropriately secured at its opposite ends to wall portions 170 and 172 of the housing 126. The face of the wall 172 that faces toward the pinion collar 164 presents a smooth radial surface 174 cooperative with a brake disc 176 secured coaxially to the pinion collar 164. Thus, when the pinion is shifted in an upward direction, as viewed in Fig. 4, the brake disk 176 engages the brake face 174 and retards rotation of the pinion.

The coordinating or actuating means for controlling engagement and disengagement of the clutch 124 and sliding pinion 150 comprises a toggle device, designated generally by the numeral 178, made up of first and second toggle links 180 and 182, at least the latter of which is adjustable as to length as illustrated. The adjacent ends of the toggle links 180 and 182 are pivotally interconnected at 184 and the remote ends are respectively pivotally connected to the clutch-control arm 142, as at 186, and to the pinion-control arm 158, as at 188. The relative lengths of the links 180 and 182 and their relationship to the arms 142 and 158 are such that the pivotal interconnection at 184 lies closer to the pivot or rockshaft 156 than to the pivot or rockshaft 140. Biasing means in the form of a tension spring 190 is connected across the toggle, being connected at one end to the pivot pin 186 and at its other end to a pin 192 carried by the pinion-control arm 158 relatively close to the rockshaft 156.

The action of the spring 190 is such as to maintain the toggle 178 in a collapsed or contracted position, thus keeping the clutch 124 out of engagement and the pinion 150 out of mesh with the diesel engine ring gear 152. The toggle may be extended or expanded by movement of the pivotal interconnection 184 to the right along a line closer to the pivot connection 188 than to the pivotal connection 186. It is important that the pinion 150 be meshed with the flywheel ring gear 152 before the clutch 124 is fully engaged. Therefore, the spring anchor point 192 is made closer to the pivot 156 than the anchor point 186 is to pivot 140. Although the spring force at each anchor point is the same, a greater moment will be applied to the arm 142 than to the arm 158, because of the unequal lengths of the arms, making it easier for arm 158 to rotate prior to arm 142 upon extension of the toggle. Should complete mesh not be obtained because of axial tooth-to-tooth contact between the pinion 150 and the flywheel ring gear 152, travel of the pinion toward engagement will, of course, be temporarily halted and pressure will be applied to the clutch 124 through the clutch-control lever 142. However, as soon as the clutch drag becomes sufficient to rotate the driven clutch shaft 128, the pinion 150 will rotate and because of the inherent pressure applied to the lever 158 through the toggle 178 and spring 190, the pinion will immediately complete its mesh with the flywheel ring gear, following which the clutch 124 will become completely engaged and the disel engine crankshaft 16 will be rotated.

Control of the toggle 178 is achieved by a rod 194 having a headed end 196, the rod 194 passing loosely through a swivel 198 pivotally connected to the rear end of a link 200, the other end of the link being connected to the toggle by the pivotal connection 184. The other end of the driving mechanism control rod 194 is pivotally connected to the control lever 64 at 202.

When the control lever 64 is moved rearwardly or in a clockwise direction from its neutral position to its position A, the toggle 178 is extended or expanded to an overcenter position maintaining engagement of both the clutch 124 and the sliding pinion 150. The overcenter position is determined by cooperative stop means comprising the right-hand or rear end of the link 200 and an adjustable stop screw 204 (Fig. 5) threaded through a portion of the casing 126 and secured in adjusted position by the jam nut 206. Since the toggle is releasable from its overcenter position by forward movement of the control lever 64, the toggle may be said to constitute releasable means for maintaining the engagement of the driving mechanisms 124 and 150 with their respective driving and driven parts 48 and 152.

As an adjunct to the holding to the driving mechanisms in their respective engaged positions, the system includes a spring-loaded stop, designated generally by the numeral 208, comprising a headed pin 210 carried by a plate 212 and biased inwardly by a coil compression spring 214. The plate is secured to the housing 126 by a pair of cap screws 216 and associated shims 218, which shims may be increased or decreased in number to provide for adjustment of the pin 210. When the toggle is extended to its overcenter position, the end of the link 182 engages the headed end of the pin and compresses the spring 214. Hence, the load on the spring 214 as it tends to extend creates a force increasing the intensity of engagement of the clutch 124.

Sliding movement of the pinion 150 into mesh with the flywheel ring gear 152 is limited by the overcenter position of link 182 against the spring-loaded stop pin 210, the housing having a recessed wall portion 220 to accommodate the pinion.

*Operation*

When both engines are idle (or running independently), the parts occupy their respective positions as illustrated, the control lever 64 being in the dotted-line position, as shown in Fig. 5, and in the full-line position of Fig. 1. Assuming that neither engine is running and that it is desired to start the main engine by the starting engine, the main control lever 64 is first moved forwardly to position B, which results in energizing of the starter motor 54 via the means 112, 114, 116 and 118. The starting engine will then operate on volatile mixture (or whatever fuel is used) and, after it has warmed up sufficiently to warrant the application thereto of the load of the main or Diesel engine, the control lever 64 is used to complete the starting procedure. The control lever 64 will, of course, have been released as soon as the starting engine starts, and the spring 92 is instrumental, through cooperation with the roller 82 and cam 74, in the return of the control lever to its neutral position.

From this point, the control lever 64 has movement in a rearward direction through first and second consecutive ranges, during the first of which decompression of the main engine is accomplished and during the second of which the sliding pinion 150 is meshed with the starter ring gear 152 and the clutch 124 is engaged.

When the control lever 64 is moved forwardly to energize the starter motor 54, the decompression control rod 36 will move rearwardly but this will have no effect on the diesel engine exhaust valve 24, since the connection at 38—32 is a one-way connection. When the control lever is moved through its first range in a rearward or clockwise direction, the one-way yieldable driving connection established by the torsion spring 106 at the inner ends of the coaxial rockshafts 60 and 62 will cause the two rockshafts to rotate in unison until the stop screw 120 engages the proximate wall portion of the support 58. This movement is represented approximately by movement of the control lever 64 from its neutral position to its position C, during which range the decompression control rod 36 is moved forwardly to cause the arm 32 to rock and engage the stop 38 on the push rod 28, resulting in opening of the exhaust valve 24 and consequently relieving compression in the diesel engine combustion chamber 22. When the control lever 64 is in position C, the roller 82 is in notch 78 which, as previously stated, will not hold the control lever in that position. That is to say, if the control lever is released, it will return to its neutral position. However, the shape of the cam between the notches 78 and 80 affords to the operator sufficient "feel" to indicate to him that the diesel engine is decompressed and that further movement of the control lever in a rearward direction to the position A will cause engagement of the clutch 124 and shifting of the sliding pinion 150. Because of the lost motion between the swivel 198 and the head 196 on the driving mechanism control rod 194, the toggle will not be picked up until the compression relief means has been operated by movement of the lever 64 through its first range (from neutral to position C).

When the lever 64 is moved from position C to position A, the rockshaft 60 is rotated, only since the torsion spring yields after the stop screw 120 encounters the rear portion of the bracket 58; hence, during the second range of movement of the lever 64, only the driving mechanism is actuated. As stated above, the sliding pinion 150 may immediately mesh with the ring gear 152, following which the clutch 124 is engaged. If the pinion does not mesh immediately, because of axial tooth-to-tooth contact, sufficient drag on the clutch will ultimately be established to rotate the pinion enough to effect mesh. The rear notch 80 in the cam 74 will engage the roller 82 when the control lever 64 is in position A and the structure is such that the control lever will be temporarily maintained in this position, during which time the starting engine will be drivingly connected to the Diesel engine and the Diesel engine will be motored.

Even though the control lever 64 be moved forwardly from position A to position C, it will not release the toggle, because of the free travel permitted between the swivel 198 and rod 194. That is to say, it takes enough movement of the rod 194 to cause the head 196 to engage the pivotal interconnection between the toggle links in order to effect collapse or retraction of the toggle from its overcenter position. The arrangement is further such that the torsion spring 160, having been wound by clockwise rotation of the shaft 60 after the stop screw 150 engages the bracket 58, will tend to unwind and thereby tend to rotate the rockshaft 62 in a counterclockwise direction. This creates a tensional force in the rod 36, which is in the same direction as the force imposed on the push rod 28 as the exhaust valve spring 40 tends to close the exhaust valve 24. The timing is such that the exhaust valve will close before the head 196 on the rod 194 breaks the toggle 178. Therefore, the Diesel engine will be returned to full compression just before the clutch 124 is disengaged and just before the sliding pinion 150 is substantially simultaneously withdrawn from mesh with the flywheel ring gear 152.

Another feature of the invention is that the Diesel engine may be stopped after running by itself by movement of the control lever 64 from neutral to position C, which results in decompressing the Diesel engine. Caution should be exercised in this method, however, because movement of the control lever beyond position C and toward position A will affect the clutch 124 and sliding pinion 150, causing possible damage to the pinion 150 and/or ring gear 152.

Various specific features of the invention not categorically enumerated herein will undoubtedly occur to those versed in the art, as will many modifications and alterations in the preferred embodiment of the invention disclosed, all of which may be achieved without departing from the spirit and scope of the invention.

What is claimed is:

1. In combination: a main engine having a combustion chamber, relief means for relieving compression in said chamber, and a starter gear; a starting engine having a driven shaft, a starter pinion keyed to said shaft and shiftable thereon from a position normally disengaged from to a position engaging the starter gear, a selectively engageable clutch normally disengaged between the starting engine and said shaft, and an energizable starter motor connected to the starting engine; a control member movable selectively in first and second opposite directions; first means connected between the control member and the starter motor for energizing said motor upon first-direction movement of said member to start the starting engine; second means connected between the control member and the relief means for relieving compression in the main engine combustion chamber upon initial second-direction movement of said member; and third means connected between the control member, the clutch and the starter pinion for substantially simultaneously causing engagement of the clutch and shifting of the starter pinion into engagement with the main engine starter gear upon subsequent second-direction movement of the control member.

2. The invention defined in claim 1, in which: the third means includes a toggle device normally relaxed between the clutch and starter gear and a force-transmitting connection between the control member and said device for expanding said device upon said subsequent second-direction movement of the control member.

3. The invention defined in claim 2, in which: the toggle device is movable to and releasably lockable in an overcenter position maintaining engagement of the clutch and engagement of the starter pinion with the starter gear.

4. The invention defined in claim 3, in which: stop means is provided for engagement with the toggle device to hold said device in said overcenter position, and said stop means includes a resilient element exerting force against the toggle in a direction increasing the engagement of the clutch.

5. The invention defined in claim 3, in which: the toggle device comprises a pair of interconnected members connected respectively to the clutch and to the starter gear; biasing means is connected between and acting on the toggle members to normally urge the clutch and starter pinion to their disengaged positions.

6. The invention defined in claim 5, including: a brake means cooperative with the starter pinion in its disengaged position, said biasing means normally effecting engagement of said pinion with said brake means.

7. The invention defined in claim 1, in which: the third means includes a lost-motion connection for delaying engagement of the clutch and starter pinion until after completion of the initial first-direction movement of the control member.

8. The invention defined in claim 1, in which: the second means includes a yieldable over-travel device enabling said subsequent second-direction movement of the control member without further actuation of said relief means.

9. In combination: a main engine having a combustion chamber, relief means for relieving compression in said chamber, and a starter gear; a starting engine having a driven shaft, a starter pinion keyed to said shaft and shiftable thereon from a position normally disengaged from to a position engaging the starter gear and a selectively engageable clutch normally disengaged between the starting engine and said shaft; a control member movable sequentially through first and second consecutive ranges; means connected between the control member and the relief means for relieving compression in the main engine combustion chamber upon first-range movement of said member; and means connected between the control member, the clutch and the starter pinion for substantially simultaneously causing engagement of the clutch and shifting of the starter pinion into engagement with the main engine starter gear upon second-range movement of the control member.

10. In combination: a main engine having a combustion chamber, relief means for relieving compression in said chamber, and a drivable starter element; a starting engine; drive means selectively connectible and disconnectible between the starting engine and the drivable starter element; a control member movable through first and second consecutive ranges; first means connected between the control member and the relief means for relieving compression in the main engine combustion chamber upon first-range movement of the control member; second means connected between the control member and the drive means for connecting the drive means upon second-range movement of the control member; and lost-motion means in said second means for delaying connection of the drive means until first-range movement of the control member is achieved.

11. In combination: a main engine having a combustion chamber, relief means for relieving compression in said chamber, and a starter gear; a starting engine having a driven shaft, a starter pinion keyed to said shaft and shiftable thereon from a position normally disengaged from to a position engaging the starter gear, a selectively engageable clutch normally disengaged between the starting engine and said shaft, and an energizable starter motor connected to the starting engine; a control member movable selectively in first and second opposite directions; coordinating means interconnecting the clutch and starter pinion for causing the two to move substantially simultaneously to their respective engaged positions and for substantially simultaneously effecting return thereof to their respective disengaged positions; first means connected between the control member and the starter motor for energizing said motor upon movement of the control member in its first direction; and second and third means connected to the control member and connected respectively to the relief means and to the coordinating means for actuating the relief means and the coordinating means in sequence in the order named upon movement of the control member in its second direction.

12. In combination: support means; a rotatable driving shaft journaled on the support means; a driven shaft journaled on the support means and having one end proximate to and another end remote from the driving shaft; clutch means selectively connectible and disconnectible between the shafts and including a driving clutch part keyed to the driving shaft and a driven clutch part shiftable toward the driving clutch part for engagement and away from the driving clutch part for disengagement; a driven gear adjacent to the remote end of the driven shaft and journaled on the support means on an axis spaced from that of the driven shaft; a pinion keyed to the driven shaft and axially shiftable toward and away from said remote end respectively for engagement with and disengagement from the driven gear; and toggle means interconnecting the clutch part and pinion and selectively collapsible to exert simultaneous forces tending to move the driven clutch part and pinion toward each other to effect disengagement thereof respectively from the driving clutch part and driven gear and expandible to exert simultaneous forces tending to move the clutch part and pinion away from each other to effect engagement thereof respectively with the driving clutch part and driven gear.

13. The invention defined in claim 12, including: stop means carried by the support means to limit expansion of the toggle means to a releasable overcenter position for maintaining engagement of each of the clutch part and the pinion; and resilient means engageable between the toggle means and the support and loaded by expansion of the toggle means to exert a force through the expanded and overcenter toggle means and acting on the clutch part to intensify engagement of said clutch part.

14. In an internal-combustion engine starting system of the type having a starting switch, compression relief means and clutch means operative sequentially in the order named, control mechanism comprising: support means, first and second coaxial rockshafts journaled on the support means with their inner end portions proximate; a clutch control lever fixed to the first rockshaft; a starter switch lever and a compression relief lever fixed to the second rockshaft; a first one-way drive connection between the inner end portions of the rockshafts enabling rocking of the rockshafts in unison in one direction; stop means engageable between the support means and the second rockshaft to limit reverse rocking of said rockshaft to a predetermined maximum; and a second one-way drive connection in the other direction between the inner ends of the rockshafts to enable reverse rocking of the rockshafts in unison until engagement of the stop means limits such reverse rocking of the second rockshaft, said second one-way drive connection including yielding means enabling continued reverse rocking of the first rockshaft beyond said limit.

15. The invention defined in claim 14, in which: the first one-way drive connection comprises first and second coaxial collars fixed respectively to the rockshafts at their inner ends and having one-way interengaging complementary jaws; and the second one-way drive connection comprises a coiled torsion spring concentrically encircling the collars and having opposite ends anchored respectively to the collars in such manner that tension in the spring is increased upon reverse rocking of the rockshafts.

16. In combination: a main engine having a combustion chamber, relief means for relieving compression in said chamber, and a drivable starter element; a starting engine; drive means selectively connectible and disconnectible between the starting engine and the drivable starter element; actuating means connected to the drive means and movable from a first position in which the drive means is disconnected to a releasable second position in which the drive means is connected; a control member movable through first and second consecutive ranges; first means connected between the control member and the relief means for relieving compression in the main engine combustion chamber upon first range movement of the control member; second means connected between the control member and the actuating means for moving the actuating means to its second position upon second-range movement of the control member, said second means including lost-motion means delaying movement of the actuating means until after first-range movement of the control means has been achieved; and delayed action means connected to the second means and effective upon reverse movement of the control means to enable restoration of the compression relief means prior to release of the actuating means from its second position.

References Cited in the file of this patent

UNITED STATES PATENTS 2,119,794     Rosen _____ June 7, 1938